(12) United States Patent
Zeng et al.

(10) Patent No.: US 11,232,277 B2
(45) Date of Patent: Jan. 25, 2022

(54) DISPLAY PANEL, DISPLAY DEVICE AND DRIVING METHOD

(71) Applicant: Shanghai Tianma Micro-Electronics Co., Ltd., Shanghai (CN)

(72) Inventors: Yang Zeng, Shanghai (CN); Feng Lu, Shanghai (CN); Haochi Yu, Shanghai (CN); Xiaoyue Su, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 219 days.

(21) Appl. No.: 16/600,803

(22) Filed: Oct. 14, 2019

(65) Prior Publication Data

US 2020/0380238 A1  Dec. 3, 2020

(30) Foreign Application Priority Data

May 31, 2019  (CN) .......................... 201910472005.7

(51) Int. Cl.
| | | |
|---|---|---|
| *G06K 9/00* | (2006.01) | |
| *G06F 3/042* | (2006.01) | |
| *G06K 9/20* | (2006.01) | |
| *G09G 3/3208* | (2016.01) | |

(52) U.S. Cl.
CPC ........... *G06K 9/0004* (2013.01); *G06F 3/042* (2013.01); *G06K 9/00026* (2013.01); *G06K 9/2027* (2013.01); *G09G 3/3208* (2013.01); *G09G 2300/0452* (2013.01)

(58) Field of Classification Search
CPC ............. G06K 9/0004; G06K 9/00026; G06K 9/2027; G06F 3/042; G09G 3/3208; G09G 2300/0452; G09G 2320/0295; H01L 27/323; H01L 27/3225
See application file for complete search history.

(56) References Cited

U.S. PATENT DOCUMENTS

2016/0266695 A1*  9/2016  Bae ..................... G06F 3/04166

* cited by examiner

*Primary Examiner* — Jonathan A Boyd
(74) *Attorney, Agent, or Firm* — von Briesen & Roper, s.c.

(57) ABSTRACT

Disclosed are a display panel, a driving method thereof and a display device. The display panel includes: a light-shielding layer including imaging apertures, a light-emitting element layer including first light-emitting elements and second light-emitting elements, a touch functional layer, and a fingerprint recognition module. The orthographic projection of the second light-emitting element on the light-shielding layer is closer to the corresponding imaging aperture than the orthographic projection of the first light-emitting element on the light-shielding layer. In a first detection stage, the first light-emitting elements emit light, the second light-emitting elements do not emit light, and the fingerprint recognition module generates a first fingerprint image. In a second detection stage, the second light-emitting elements emit light, and the fingerprint recognition module generates a second fingerprint image. The first fingerprint image and the second fingerprint image are combined into a fingerprint image.

17 Claims, 11 Drawing Sheets

DISPLAY PANEL, DISPLAY DEVICE AND DRIVING METHOD

CROSS-REFERENCES TO RELATED APPLICATIONS

This application claims priority to Chinese patent application No. CN201910472005.7 filed at CNIPA on May 31, 2019, the disclosure of which is incorporated herein by reference in its entirety.

TECHNICAL FIELD

The application relates to a display technology and, in particular, to a display panel, a driving method of the display panel and a display device.

BACKGROUND

For everybody, fingerprints are inherent and unique. With the development of science and technology, various display devices having fingerprint recognition functions appearing on the market. Such devices include mobile phones, tablet PCs, smart wearable equipment, etc. In this way, before operating a display device having fingerprint recognition functions, a user just needs to touch a fingerprint recognition module of the display device by a finger for the authority verification, thereby simplifying the authority verification process.

In the existing display device with the fingerprint recognition function, the fingerprint image acquired by the fingerprint recognition module is influenced at least by noise of sub-pixels and signal light reflected by the finger, resulting in poor precision of the fingerprint identification module.

SUMMARY

In embodiments of the present disclosure, a display panel, a driving method thereof and a display device are provided to improve the precision of fingerprint recognition.

An embodiment of the present disclosure provides a display panel. The display panel includes: a fingerprint recognition module, a light-shielding layer on the fingerprint recognition module, a light-emitting element layer located on the light-shielding layer, and a touch functional layer located on the light-emitting element layer The light-shielding layer includes a plurality of imaging apertures. The light-emitting element layer includes a plurality of light-emitting elements. Each of the plurality of imaging apertures corresponds to a plurality of first light-emitting elements and a plurality of second light-emitting elements among the plurality of light-emitting elements.

The distance between an orthographic projection of the first light-emitting element on a plane of the light-shielding layer and the corresponding imaging aperture is greater than the distance between an orthographic projection of the second light-emitting element on the plane of the light-shielding layer and the corresponding imaging aperture.

In a first detection stage, the plurality of first light-emitting elements emit light, the plurality of second light-emitting elements do not emit light, and the fingerprint recognition module generates a first fingerprint image.

In a second detection stage, the plurality of second light-emitting elements emit light, and the fingerprint recognition module generates a second fingerprint image.

The first fingerprint image and the second fingerprint image are combined to obtain a fingerprint image.

An embodiment of the present disclosure further provides a driving method of a display panel. The display panel includes a fingerprint recognition module, a light-shielding layer on the fingerprint recognition module, a light-emitting element layer located on the light-shielding layer, and a touch functional layer located on the light-emitting element layer. The light-shielding layer includes a plurality of imaging apertures. The light-emitting element layer includes a plurality of light fitting elements. Each of the plurality of imaging apertures corresponds to a plurality of first light-emitting elements and a plurality of second light-emitting elements among the plurality of light-emitting elements. The distance between an orthographic projection of the first light-emitting element on a plane of the light-shielding layer and the corresponding imaging aperture is greater than the distance between an orthographic projection of the second light-emitting element on the plane of the light-shielding layer and the corresponding imaging aperture.

The driving method includes: in a first detection stage, the plurality of first light-emitting elements emit light, the plurality of second light-emitting elements do not emit light, and the fingerprint recognition module generates a first fingerprint image; in a second detection stage, the plurality of second light-emitting elements emit light, and the fingerprint recognition module generates a second fingerprint image; and the first fingerprint image and the second fingerprint image are combined to obtain a fingerprint image.

An embodiment of the present disclosure further provides a display device including the display panel.

According to the display panel provided by the embodiment of the present disclosure, each imaging aperture corresponds to a plurality of first light-emitting elements and a plurality of second light-emitting elements among the plurality of light-emitting elements. The distance between the orthographic projection of the first light-emitting element on the plane of the light-shielding layer and the corresponding imaging aperture is greater than the distance between the orthographic projection of the second light-emitting element on the plane of the light-shielding layer and the corresponding imaging aperture. In the first detection stage, the plurality of first light-emitting elements emit light, none of the plurality of second light-emitting elements emits light, the fingerprint recognition module generates a first fingerprint image. The first fingerprint image does not include noise points caused by light emitted by the second light-emitting elements and reflected by the touch functional layer. The number of the noise points in the first fingerprint image is remarkably reduced. In a second detection stage, the plurality of second light-emitting elements emit light, and the fingerprint recognition module generates a second fingerprint image. The first fingerprint image and the second fingerprint image are combined. The number of noise points in the fingerprint image is apparently reduced without losing the minutiae of the fingerprint, and the fingerprint recognition precision is improved.

BRIEF DESCRIPTION OF DRAWINGS

To illustrate technical solutions in the embodiments of the present disclosure or in the related art more clearly, drawings used in description of the embodiments or the related art will be briefly described below. Apparently, the drawings described below illustrate only part of the embodiments of the present disclosure, and those skilled in the art may obtain other drawings based on the drawings described below without creative work.

DETAILED DESCRIPTION

The technical solutions of the present disclosure will be described clearly and completely with reference to the accompanying drawings through embodiments. Apparently, the embodiments described below are part, not all, of embodiments of the present disclosure. Based on the embodiments described herein, all other embodiments obtained by those of ordinary skill in the art without creative work are within the scope of the present disclosure.

Figure 1:
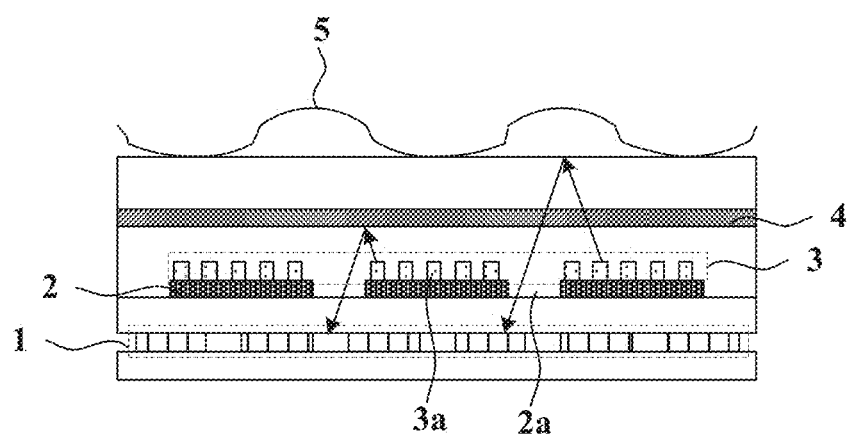
FIG. 1 is a schematic view of a display panel in the related art.

A fingerprint image of an existing display device has noise, which affects the precision of fingerprint recognition. FIG. 1 is a schematic view of a display device in the related art. As shown in FIG. 1, the display device includes at least a fingerprint recognition module 1, a light-shielding layer 2, a light-emitting element layer 3 and a touch functional layer 4. The light-shielding layer 2 includes a plurality of imaging apertures 2a. The light-emitting element layer includes a plurality of light-emitting elements 3a. The light-emitting element layer 3 is between the touch functional layer 4 and the light-shielding layer 2. The display device has a touch surface. A touch object 5 presses the touch surface of the display device. The touch body 5 may be a finger. In the fingerprint recognition stage, the light-emitting elements 3a in the light-emitting element layer 3 emit lights which are multiplexed as light sources for the fingerprint recognition. The lights emitted by the light-emitting elements 3a are reflected by the touch object 5, then the reflected lights pass through the imaging apertures 2a of the light-shielding layer 2 and received by the fingerprint recognition module 1. According to the received optical signal, the fingerprint recognition module 1 generates the fingerprint image. However, the fingerprint recognition precision of this display device is low.

The low fingerprint recognition precision may be caused by the following reasons. The touch functional layer 4 of the display device includes an electrode layer made from material with a high reflectivity such as ITO, so the light emitted from the light-emitting element layer 3 may be reflected by the touch functional layer 4. When the light-emitting element 3a of the light-emitting element layer 3 emits light, the light emitted by the light-emitting element 3a passes through the touch functional layer 4 and is incident to the surface of the touch object 5. The light is then reflected by the touch object 5 and referred to as finger signal light. The finger signal light passes through the imaging aperture 2a of the shielding layer 2 and is received by the fingerprint recognition module 1. Part of the light emitted by the light-emitting element 3a is reflected by the touch functional layer 4. The light reflected by the touch functional layer 4 passes through the imaging aperture 2a of the light-shielding layer 2 and is also received by the fingerprint recognition module 1. The fingerprint recognition module 1 generates the fingerprint image according to the received finger signal light and the light reflected by the touch functional layer 4. The light reflected by the touch functional layer interferes with the finger signal light and influences the quality of the fingerprint image. The pixel generated by the fingerprint recognition module 1 according to the light reflected by the touch functional layer 4 in the fingerprint image is called noise.

Figure 2:
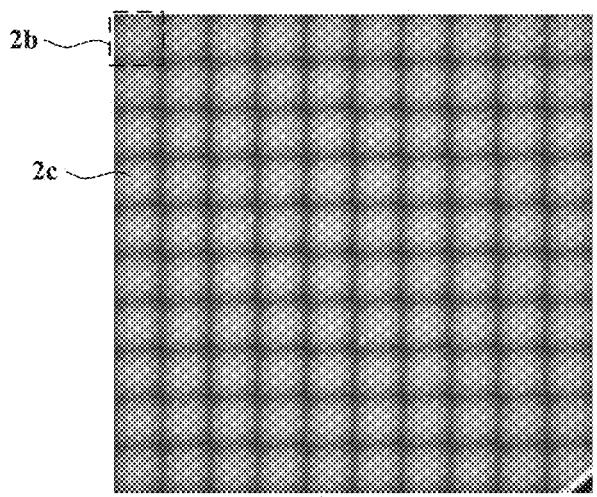
FIG. 2 is a schematic view of a fingerprint image obtained by a fingerprint recognition module of the display device shown in FIG. 1.

FIG. 2 is a schematic view of a fingerprint image obtained when the display device shown in FIG. 1 performs fingerprint recognition. Each imaging aperture 2a corresponds to a recognition range on the touch surface. The imaging aperture 2a can only allow lights reflected by its recognition range on the touch surface to pass through. Each grid cell 2b (for example, the grid cell is a square region encircled by a dotted line in the FIG. 2) in FIG. 2 is an image generated by the fingerprint recognition module 1 based on the lights which are reflected by the recognition range on the touch surface corresponding to the imaging aperture 2a and then passed through the imaging aperture 2a, and the image generated by the fingerprint recognition module 1 based on the lights reflected by the recognition range of the imaging aperture 2a can be referred to as a region image. In an exemplary embodiment, the imaging apertures 2a of the light shielding layer 2 are arranged in an array, and accordingly, the region images corresponding to the imaging apertures 2a are also arranged in an array, and the fingerprint image of the display panel includes a plurality of region images. As shown in FIG. 2, each grid cell 2b includes white bright spots, the white bright spots are noise points 2c, and the noise points 2c reduce the definition of the fingerprint image.

In view of the above, when the fingerprint recognition module of the existing display device generates the fingerprint images, the fingerprint image is generated according to not only the light reflected by the finger but also the noise point reflected by the light-emitting element on the touch functional layer. The finger signal lights and the noise points are mixed, and the quality of the fingerprint image is reduced.

Figure 3:
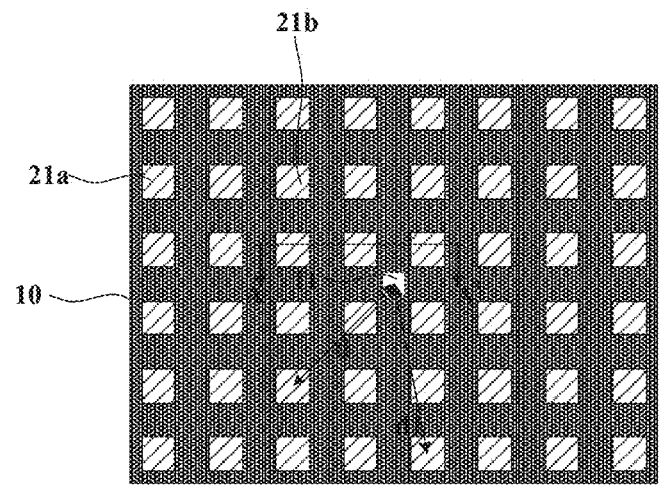
FIG. 3 is a schematic view of a display panel according to an embodiment of the present disclosure.
Figure 4:
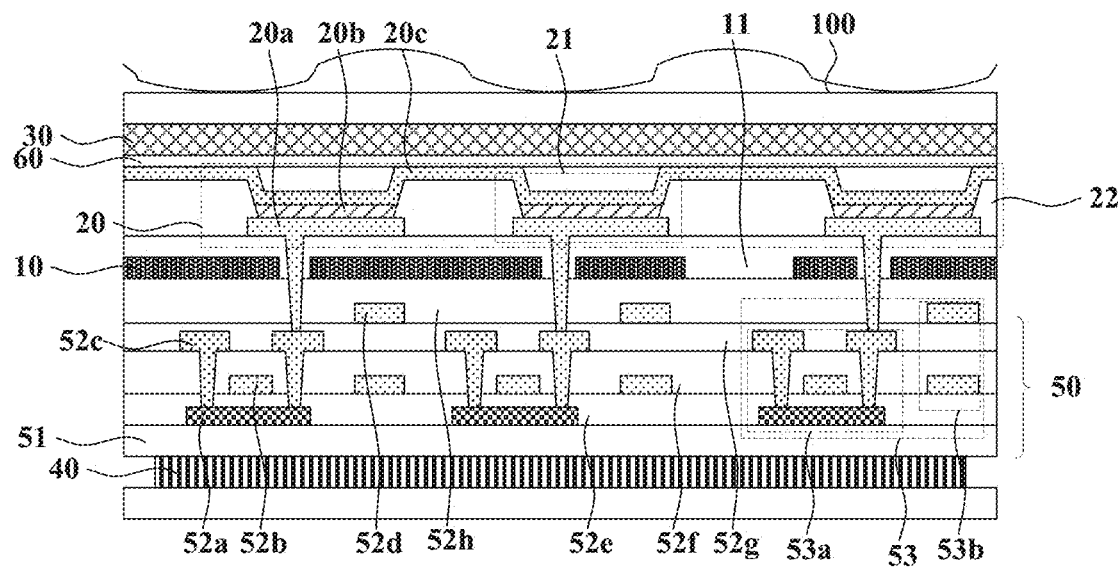
FIG. 4 is a sectional view of the display panel taken along a line A-A' of FIG. 3.

In view of the above, an embodiment of the present disclosure provides a display panel. FIG. 3 is a schematic view of a display panel according to an embodiment of the present disclosure. FIG. 4 is a sectional view of the display panel taken along a line A-A' of FIG. 3 show a top view of a light-shielding layer 10 and shows a plane where the light-shielding layer 10 is located. The box filled with oblique lines and marked with the reference sign 21a represents the projection of the first light-emitting element 21a of the light-emitting element layer 20 on the light-shielding layer 10, and the box filled with oblique lines marked with the reference sign 21b represents the projection of the second light-emitting element 21b of the light-emitting element layer 20 on the light-shielding layer 10.

The display panel provided by the embodiment includes a light-shielding layer 10, a light-emitting element layer 20 on the light-shielding layer 10, a touch function layer 30, and a fingerprint recognition module 40. The light-shielding layer 10 has a first side and a second side opposite to the first side. The light-emitting element layer 20 is disposed on the first side of the light-shielding layer 10. The light-emitting element layer 20 is between the light-shielding layer 10 and the touch function layer 30. The fingerprint recognition module 40 is disposed on the second side of the light-shielding layer 10. The light-shielding layer 10 includes a plurality of imaging apertures 11. The light-emitting element layer 20 includes a plurality of light-emitting elements 21. The plurality of light-emitting elements 21 includes a plurality of first light-emitting elements 21a and a plurality of second light-emitting elements 21b. The distance d1 between the orthographic projection of the first light-emitting element 21a on the plane of the light-shielding layer 10 and the imaging aperture 11 is greater than the distance d between the orthographic projection of the second light-emitting element 21b on the plane of the light-shielding layer 10 and the imaging aperture 11. In a first detection stage, the first light-emitting elements 21a emit lights, the second light-emitting elements 21b do not emit light, and a first fingerprint image is generated by the fingerprint recognition module 40. In a second detection stage, the second light-emitting elements 21b emit lights, and a second fingerprint image is generated by the fingerprint recognition module 40. The first fingerprint image and the second fingerprint image are combined to obtain a fingerprint image. It should be noted that the distance between the orthographic projection of the light-emitting element on the plane of the light-shielding layer and the imaging aperture specifically refers to the distance between the orthographic projection of the center of the light fitting element on the plane of the light-shielding layer and the center of the imaging aperture.

Specifically, the display panel further includes: an array substrate 50. The array substrate 50 includes a substrate 51. A pixel circuit array and signal lines are arranged on the substrate 51. The pixel circuit array is configured to control the light-emitting element layer 20 to emit light. The pixel circuit array receives signals via signal lines. In one or more embodiments, the substrate 51 is between the light-shielding layer 10 and the fingerprint recognition module 40. In other embodiments, the fingerprint recognition module 40 is between the substrate 51 and the light-shielding layer 10. The substrate 51 may be made of transparent glass or polyimide, but is not limited thereto. Any material applicable to the substrate of the display panel of the present disclosure falls in the scope of the present disclosure.

The display panel further includes the pixel circuit array disposed on the substrate 51. In one or more embodiments, the pixel circuit array includes: an active layer 52a, a plurality of metal layers, and a plurality of insulating layers. The plurality of metal layers are insulated from each other by the plurality of insulating layers. Specifically, the plurality of metal layers at least include a gate metal layer 52b, a source/drain metal layer 52c, and a capacitor metal layer 52d. The plurality of insulating layers include a first insulating layer 52e, a second insulating layer 52f, a third insulating layer 52g, and a fourth insulating layer 52h. The pixel circuit array includes pixel circuits 53, electrically connected to the plurality of light-emitting elements 21. Each of the pixel circuits 53 corresponds to and is electrically connected to a respective one of the plurality of light-emitting elements 21. Each of the pixel circuits 53 includes at least a thin film transistor 53a and a storage capacitor 53b.

The display panel further includes the light-shielding layer 10 located on a side of the light-emitting element layer 20 facing away from the touch functional layer 30, and in particular the light-shielding layer 10 is located between the pixel circuit array and the light-emitting element layer 20. The light-shielding layer 10 is made of opaque material such as metal or opaque resin. In an exemplary embodiment, the light-shielding layer 10 is made of black opaque resin, but is not limited thereto. The light-shielding layer 10 includes a plurality of imaging apertures 11. The imaging apertures 11 are via holes running through the light-shielding layer 10 and are evenly distributed in the light-shielding layer 10.

Figure 5:
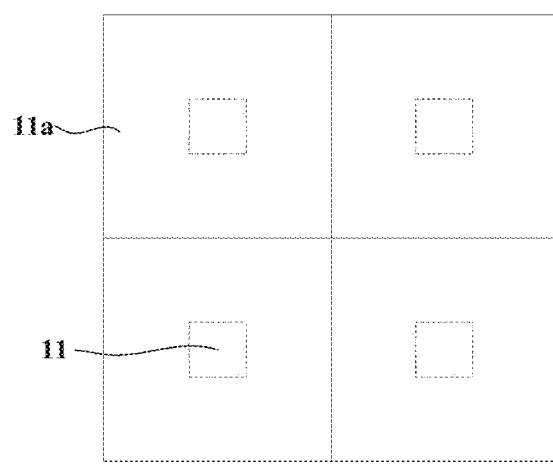
FIG. 5 is a schematic view of a recognition range of an imaging aperture of a display panel according to an embodiment of the present disclosure.

Specifically, the number of the imaging apertures 11 of the light-shielding layer 10 is small. In this embodiment, the number of the imaging apertures 11 is less than the number of the light emitting elements 21, each of the plurality of imaging apertures 11 corresponds to dozens of the light-emitting elements 21, and the imaging apertures 11 do not overlap with the light-emitting elements 21. The aperture of the imaging aperture 11 is configured such that the imaging aperture 11 only allows lights within its recognition range to pass through, that is, the imaging aperture 11 has an imaging aperture recognition range. FIG. 5 is a schematic view showing imaging aperture identification ranges of four adjacent imaging apertures. The imaging aperture recognition range 11a refers to a region of the touch surface 100 (the touch surface is where the finger presses the display panel), the light reflected by which can pass through the imaging aperture 11. FIG. 5 shows four adjacent imaging apertures 11's recognition ranges 11a on the touch surface 100. Optionally, the imaging aperture identification range 11a of each imaging aperture 11 does not overlap the imaging aperture recognition range 11a of another imaging aperture 11, and there is no gap between the imaging aperture recognition ranges 11a of adjacent imaging apertures 11 (that is, the distance between the imaging aperture recognition ranges 11a of adjacent imaging apertures 11 is zero), thereby reducing pixel crosstalk and improving fingerprint recognition precision. In the embodiment, the imaging apertures 11 are uniformly arranged, the corresponding imaging aperture recognition ranges 11a are also uniformly arranged, and the images acquired using the imaging apertures 11 are also uniformly arranged.

In the embodiment, the display panel further includes the light-emitting element layer 20, and the light-emitting element layer 20 is located on one side, facing away from the fingerprint recognition module 40, of the light shielding layer 10. The light-emitting element layer 20 is also referred to as a light-emitting functional layer, and at least includes: an anode layer 20a, a cathode layer 20c, and a light-emitting layer 20b located between the anode 20a and the cathode 20c. Each of the light-emitting elements 21 has an anode 20a in the anode layer, and the anodes 20a are independent from each other and insulated from each other. The cathode layer 20c is common to the light-emitting elements 21. The anode 20a is a reflective electrode, and may be made of reflective conductive material, such as reflective metal. For example, the anode 20a is made of Ag, Au, Al alloy, Mo alloy, Cu alloy, Al, Ti, or Cr. The cathode layer 20c is a transparent conductive film, and may be made of transparent material such as ITO.

It is understood that, in the embodiment, the light-emitting element layer 20 located on the light shielding layer 10 includes the light-emitting elements 21. In one or more embodiments, the light-emitting element 21 is an organic light-emitting diode, the light-emitting layer of the organic light emitting diode is a layer of organic light-emitting material, and the organic light-emitting diode includes an anode, a cathode and the layer of organic light-emitting material located between the anode and the cathode. Each organic light-emitting diode is driven by a respective one of the pixel circuits 53. The organic light-emitting diode further includes: a hole transport layer, a hole injection layer, an electron transport layer and an electron injection layer. The hole transport layer and the hole injection layer are arranged between the anode and the organic light-emitting material layer. The electron transport layer and the electron injection layer are arranged between the organic light-emitting material layer and the cathode. The light emitting mechanism of the organic light-emitting diode is as follows. When a certain voltage is applied to the anode and the cathode, electrons are injected into the electron injection layer from the cathode and holes are injected into the hole injection layer from the anode. The electrons migrate to the organic light-emitting material layer through the electron transport layer and the holes migrate to the organic light-emitting material layer through the hole transport layer. The electrons and holes are recombined in the organic light-emitting material layer and excitons are generated so that light-emitting molecules in the organic light-emitting material layer are excited, and the light emitting molecules emit visible light through radiation relaxation.

The display panel further includes a pixel defining layer 22. The pixel defining layer 22 is located above the thin film transistor 53a. Specifically, the pixel defining layer 22 has openings exposing the anodes 20a. The anode 20a is partially exposed by the opening of the pixel defining layer, and the opening of the pixel defining layer is filled with organic light-emitting material. The boundary of the light-emitting element 21 in the present disclosure may be defined by the opening of the pixel defining layer, that is, one opening of the pixel defining layer defines a minimum display unit.

The display panel further includes an encapsulation layer 60 which is located on the side, facing the light shielding layer 10, of the touch functional layer 30. Optionally, the encapsulation layer 60 is a thin film encapsulation layer. The thin film encapsulation layer may be an inorganic film. The thin film encapsulation layer includes inorganic films and organic polymer films alternately stacked with the inorganic films. The inorganic films can block water and oxygen, and the organic polymer films can reduce stress. Optionally, the inorganic thin film may be made of one or more of silicon nitride, silicon oxide, aluminum oxide, titanium oxide, zirconium oxide, magnesium oxide, and hafnium oxide, and the organic polymer thin film may be made of acryl-based polymers, silicon-based polymers, or epoxy-based polymers.

In the embodiment, the display panel further includes the fingerprint recognition module 40, and the fingerprint recognition module 40 is located on one side, facing away from the light shielding layer 10, of the substrate 51, but is not limited thereto, In other embodiments, the fingerprint recognition module may be located between the substrate and the light shielding layer. The fingerprint recognition module 40 implements the fingerprint recognition mainly based on light refraction and light reflection. The operation principle of the fingerprint recognition module 40 is as follows. As a fingerprint recognition light source, the light-emitting element 21 in the light-emitting element layer 20 emits light. When a finger presses the touch surface 100 of the display panel, light emitted by the light-emitting element 21 is incident on the touch surface 100 and reflected by the valley and ridge of the finger, and the reflected light is received by the fingerprint recognition module 40. The fingerprint recognition module 40 generates a corresponding electrical signal according to the intensity of the finger signal light, and generates a fingerprint image according to the electrical signal.

In the embodiment, the light-emitting element layer 20 includes a plurality of light-emitting elements 21, and the plurality of light-emitting elements 21 include at least two types. Specifically, the plurality of light-emitting elements 21 include a plurality of first light-emitting elements 21a and a plurality of second light-emitting elements 21b. The distance d1 between the orthographic projection of the first light-emitting element 21a on the plane of the light shielding layer 10 and the imaging aperture 11 is greater than the distance d between the orthographic projection of the second light-emitting element 21b on the plane of the light shielding layer 10 and the imaging aperture 11. That is, the second light-emitting element 21b is closer to the imaging aperture 11 than the first light-emitting element 21a to the imaging aperture 11.

Optionally, in the fingerprint recognition stage, the light-emitting element 21 serves as the light source for the fingerprint recognition. The light emitted by the light-emitting element 21 is propagated to the touch surface 100, reflected by the touch object, passes through the imaging aperture 11, and then is received by the fingerprint recognition module 40. In the embodiment, the fingerprint recognition stage includes a first detection stage and a second detection stage. In the first detection stage, the first light-emitting elements 21a emit lights, the second light-emitting elements 21b do not emit light, and the fingerprint recognition module 40 generates a first fingerprint image. In the second detection stage, the second light-emitting elements 21b emit lights, and the fingerprint identification module 40 generates a second fingerprint image. The fingerprint image is acquired by combining the first fingerprint image and the second fingerprint image.

Figure 6:
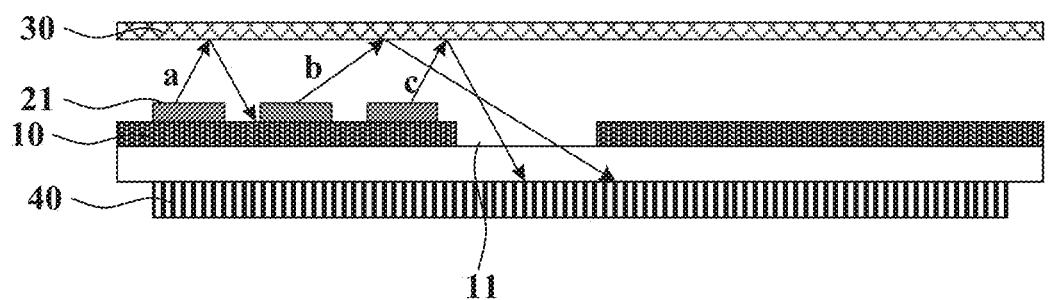
FIG. 6 is a schematic view illustrating a light path of a light-emitting element of a display panel provided by an embodiment of the present disclosure.

FIG. 6 is a schematic view showing a propagating path of the light emitted from the light-emitting element. FIG. 6 only shows the propagating path of light reflected by the touch functional layer. The light-emitting element 21 emits light in all directions. The light a is reflected by the touch functional layer 30, and then blocked by the light-shielding layer 10, and thus is not received by the fingerprint recognition module 40, so that fingerprint imaging is not affected by the light a. The light b is also reflected by the touch functional layer 30, the reflected light passes through the imaging aperture 11, but is filtered by the display panel due to a large incident angle, so the fingerprint imaging is not affected by the light b. An air layer exists between the fingerprint recognition module 40 and the light shielding layer 10. After the reflected light b passes through the imaging aperture 11, the reflected light cannot reach the fingerprint recognition module 40 through the air layer since the reflected light is filtered due to the large incident angle. Alternatively, two adjacent films exist between the fingerprint recognition module 40 and the light shielding layer 10, and the difference of the refractive indexes of the two adjacent films is large. The reflected light b passes through the imaging aperture 11, but cannot passes through the interface of the two adjacent films with large refractive index difference due to the large incident angle. In this case, the reflected light is also filtered. The light c is also reflected by the touch functional layer 30, and the reflected light can pass through the imaging aperture 11 and be received by the fingerprint recognition module 40, and the incident angle of the reflected light c meets the light receiving angle condition of the fingerprint recognition 40. The light c is a serve interference to the fingerprint image. The light b is reflected by the touch functional layer 30, and the reflected light passing through the imaging aperture 11 may be received by the fingerprint recognition module 40, but is filtered by the fingerprint recognition module 40 of the display panel due to the large incident angle.

As shown FIG. 6, the light emitted from the light-emitting element 21 closer to the imaging aperture 11 and reflected by the touch functional layer 30 is more likely to be received by the fingerprint recognition module 40 and has a greater interference to the fingerprint image.

The second light-emitting element 21b is closer to the imaging aperture 11 than the first light-emitting element 21a, the light generated by the second light-emitting element 21b and reflected by the touch functional layer 30 may pass through the imaging aperture 11 and enter the fingerprint recognition module 40. Most of the light has a small incident angle that meets the light reception angle condition of the fingerprint recognition module 40, and causes noise points in fingerprint image. Some of the light generated by the first light-emitting element 21a and reflected by the touch functional layer 30 may be blocked by the light shielding layer 10. Some of the light generated by the first light-emitting element 21a and reflected by the touch functional layer 30 may pass through the imaging aperture 11 and enter the fingerprint recognition module 40. Most of the light entering the fingerprint recognition module 40 has a large incident angle that does not meet the light reception angle condition of the fingerprint recognition module 40. A little part of the light entering the fingerprint recognition module 40 has an incident angle meeting the light reception angle condition of the fingerprint recognition module 40, and causes a small amount of noise points in fingerprint image. In view of the above, for the fingerprint image acquired through the imaging apertures 11, the noise caused by the light emitted from the second light-emitting element 21b and reflected by the touch functional layer 30 is greater than the noise caused by the light emitted from the first light-emitting element 21a and reflected by the touch functional layer 30.

Figure 7:
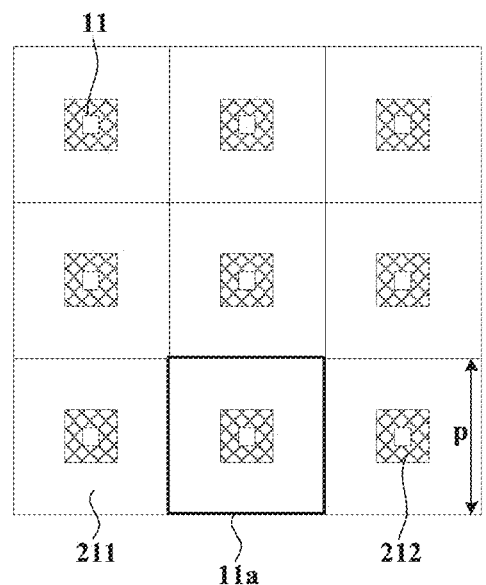
FIG. 7 is a schematic view illustrating a display image of the display panel in a first detection stage according to an embodiment of the present disclosure.
Figure 8:
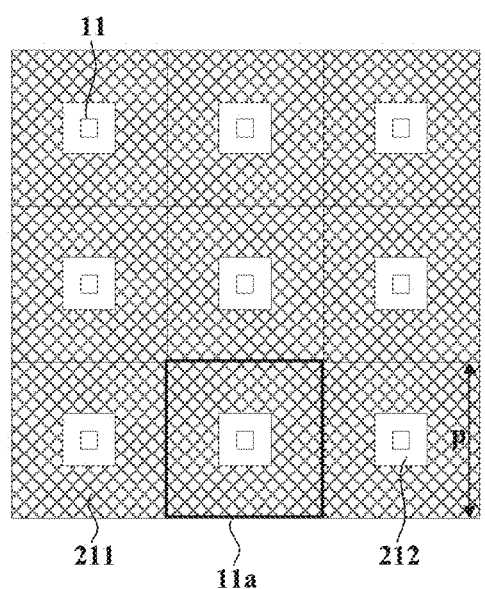
FIG. 8 is a schematic view illustrating a display image of the display panel in a second detection stage according to an embodiment of the present disclosure.

FIG. 7 is a schematic view showing the luminescence statuses of the light-emitting elements in the first detection stage. FIG. 8 is a schematic view showing the luminescence statuses of the light-emitting elements in the second detection stage. Here, the display region corresponding to the light-emitting elements which are emitting light is filled with white, and the display region corresponding to the light-emitting elements which are not emitting light is filled with a pattern. It should be noted that in the embodiment shown in FIG. 8, the second light-emitting elements in the region 212 are emitting light, and the first light-emitting elements in the region 211 are not emitting light, in other embodiments, the first light-emitting elements in the region 211 emit light in the second detection stage. It can be understood that the imaging aperture recognition range 11a shown in FIGS. 7 and 8 is the region of the touch surface 100, the light reflected by this region may pass the imaging aperture 11; the region with the reference number 11 is a projection of the imaging aperture 11 of the light shielding layer 10 on the touch surface 100. The region with the reference number 211 is the projection of the first light-emitting element 21a on the touch surface 100, and the region with the reference number 212 is the projection of the second light-emitting element 21b on the touch surface. The second light-emitting element 21b is closer to the imaging aperture 11 than the first light-emitting element 21a.

Figure 9:
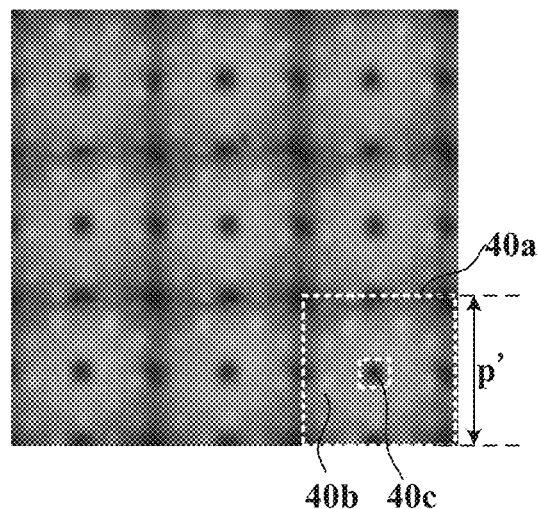
FIG. 9 is a schematic view of a first fingerprint image obtained when a display panel performs fingerprint recognition according to an embodiment of the present disclosure.
Figure 10:
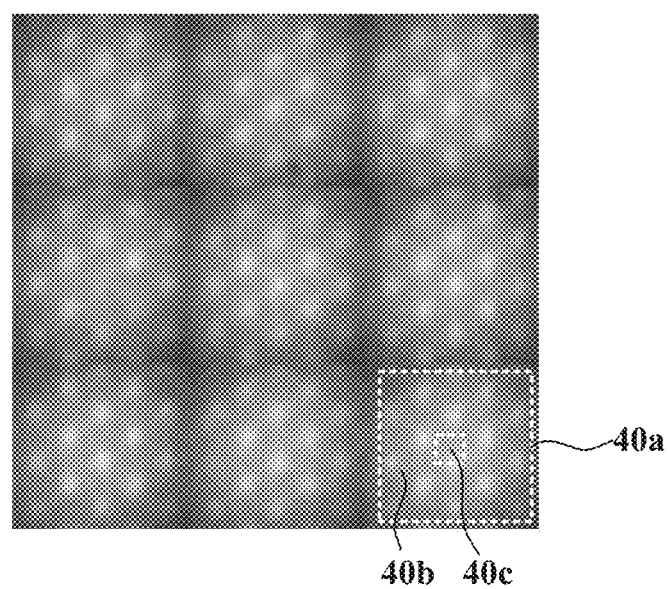
FIG. 10 is a schematic view of a second fingerprint image obtained when a display panel performs fingerprint recognition according to an embodiment of the present disclosure.
Figure 11:
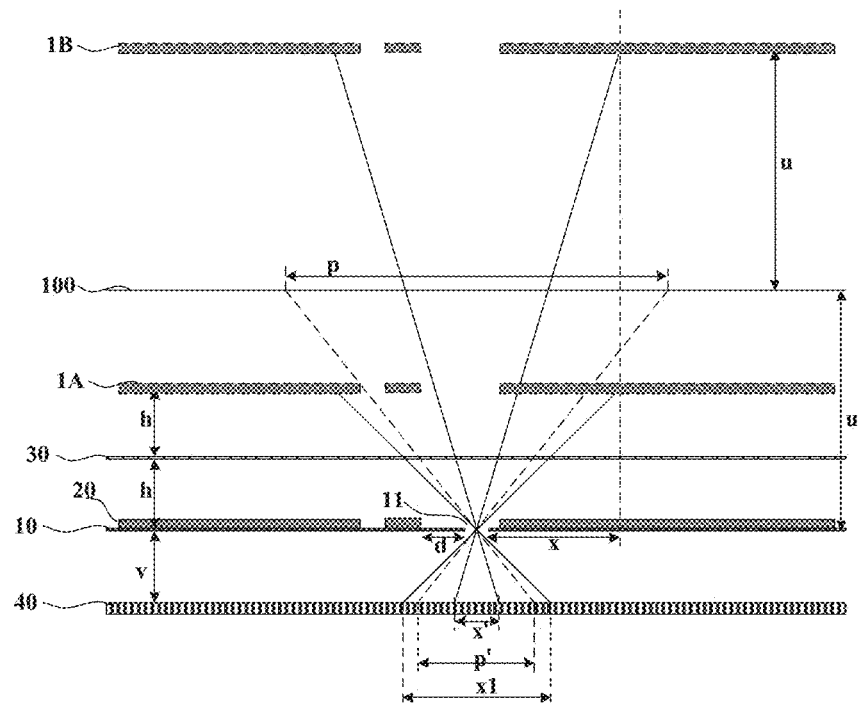
FIG. 11 is a schematic view of fingerprint imaging when a light-emitting element in a display panel is used as a light source for the fingerprint recognition according to an embodiment of the present disclosure.

FIG. 9 is a partial schematic view of a first fingerprint image. FIG. 10 is a partial schematic view of a second fingerprint image. Each grid cell 40a in the fingerprint image is an image region generated by the fingerprint recognition module 40 based on the light reflected by the imaging aperture recognition range 11a. Optionally, the grid cell 40a includes a first image region 40b and a second image region 40c. Optionally, the imaging aperture 11 corresponds to a center of the imaging aperture recognition range 11a. Optionally, in order to improve the recognition accuracy and ensure uniform recognition accuracy in each direction, the recognition range of the imaging aperture is square. Herein, p denotes the distance between the center points of any two adjacent aging apertures 11, the boundaries of the two adjacent imaging aperture recognition ranges 11a are joined (that is, there is no gap between the two adjacent imaging aperture recognition ranges), and therefore the side length of the imaging aperture recognition range 11a is also p. FIG. 11 shows a schematic view of a fingerprint imaging principle when the light-emitting elements serve as fingerprint identification light sources. The virtual plane 1A is a mirror image of the light-emitting element layer 20 with respect to the touch functional layer 30 and the virtual plane 1B is a mirror image of the light-emitting element layer 20 with respect to the touch surface 100.

The fingerprint identification of the display panel provided by this disclosure is based on pinhole imaging. The fingerprint image generated by the fingerprint recognition module 40 includes multiple image regions, each image region is a pinhole image of a corresponding region (the imaging aperture recognition range) of the touch surface 100 generated through the corresponding imaging aperture. The side length of the imaging aperture recognition range is p. Based on the pinhole imaging principle, the side length of the image region, corresponding to the imaging aperture recognition range 11a, in the fingerprint image generated by the fingerprint recognition module 40 is p', that is, the side length of the grid cell 40a is p'.

The pinhole image generated by the fingerprint recognition module 40 and the imaging aperture 11 based on the lights which are emitted from the second light-emitting elements 21b having a distance to the imaging aperture 11 less than or equal to x and reflected by the touch surface 100 has a side length x', that is, this fingerprint image region with the side length x' is the imaging region of the finger signal light formed by the light emitted from the second light-emitting element 21b and reflected by the touch surface 100, that is, the second imaging region 40c. Apparently, x' is the side length of the second imaging region 40c in the grid cell 40a.

The image region formed by the fingerprint recognition module 40 based on the lights emitted by the first light-emitting elements 21a and reflected by the imaging aperture recognition range 11a on the touch surface 100 is mainly located between the fingerprint imaging region x' and the fingerprint imaging region p'. The first imaging region 40b is generated by the fingerprint recognition module 40 based on the lights which are emitted by the first light-emitting elements 21a and reflected.

The light emitted by the second light-emitting element 21b a distance between which and the imaging aperture 11 is less than or equal to x may be reflected by the touch functional layer 30, the side length of the pinhole image formed by the fingerprint recognition module 40 based on the reflected light is x1, this region is also referred to as a noise imaging region. The noise imaging region is the pinhole imaging range of the lights emitted by the second light-emitting elements in the second light-emitting element region and reflected by the touch functional layer 30. In other words, the white bright point (i.e., a noise point 2c) in each grid cell 2b in FIG. 2 corresponds to an image of a certain light-emitting element, the white bright point is generated by the light reflected by the touch functional layer 30. If all the second light-emitting elements 21b in the second light-emitting element region are turned off, the second light-emitting elements in second light-emitting element region do not emit light, and no noise point is generated in the corresponding noise imaging region x1. The noise imaging region x1 and the fingerprint imaging region p' of one imaging aperture 11 overlap each other. By turning off the second light-emitting elements in the second light-emitting element region, the number of the noise points in the fingerprint imaging region p' can be reduced.

As described above, the second light-emitting element 21b is closer to the imaging aperture 11 than the first light-emitting element 21a. According to the pinhole imaging principle, the image generated in the fingerprint recognition module 40 by the finger signal light formed by the light emitted by the second light-emitting element 21b is mainly located in the second imaging region 40c, and the image generated in the fingerprint recognition module 40 by the finger signal light formed by the light emitted by the first light-emitting element 21a is mainly located in the first imaging region 40b. The boundary of the first imaging region 40b and the boundary of the second imaging region 40c in the same grid cell 40a are joined, that is, there is no gap between the first imaging region 40b and the second imaging region 40c.

In a first detection stage, the first light-emitting elements 21a emit light, the second light-emitting elements 21b do not emit light, and the fingerprint recognition module 40 generates a first fingerprint image. FIG. 9 shows the image generated by the lights emitted from the first light fitting elements 21a in the first imaging region 40b of the grid cell 40a. Since the second light-emitting elements 21b do not emit light, the noise points in the first imaging region 40b of the grid cell 40a caused by the second light-emitting elements 21b are reduced or eliminated. Therefore, the noise points in the first imaging region 40b of the grid cell 40a in the first fingerprint image are significantly reduced and the definition of the first fingerprint image is improved.

However, since the second light-emitting elements 21b do not emit light, the light reflected by the touch object and received by the fingerprint recognition module 40 is also reduced and the image corresponding to the second light-emitting elements 21b is not generated in the second imaging region 40c of the grid cell 40a in the first fingerprint image, and the generated first fingerprint image has a region without fingerprint image, that is a region not showing fingerprint characteristics, and the fingerprint image is incomplete. As shown in FIG. 9, a black dot in the second imaging region 40c represents the region not showing fingerprint characteristics. In a second detection stage, the second light-emitting elements 21b emit light, and the fingerprint recognition module 40 generates a second fingerprint image. The second fingerprint image is generated in the fingerprint recognition module 40 by the finger signal light (the light emitted by the second light-emitting elements 21b and reflected by the touch surface) and the interference light (the light emitted by the second light-emitting elements 21b and reflected by the touch functional layer 30). The image generated by the finger signal light (the light emitted by the second light-emitting elements 21b and reflected by the touch surface 100) is mainly located in the second imaging region 40c, and the image generated by the lights emitted by the second light-emitting elements 21b is located in the second imaging region 40c of the grid cell 40a shown in FIG. 10.

The first fingerprint image and the second fingerprint image are combined. The combination process is as follows. The grid cell 40a of the fingerprint image formed by using the first fingerprint image and the second fingerprint image includes the first imaging region 40b of the first fingerprint image and the second imaging region 40c of the second fingerprint image. In the generated fingerprint image, the first imaging region 40b of each grid cell 40a has the image formed by the light emitted by the first light-emitting elements 21a and reflected by the touch surface, and the second imaging region 40c of each grid cell 40a has image formed by the light emitted by the second light-emitting elements 21b and reflected by the touch surface. Solved is the problem that the first fingerprint image has a region without fingerprint imaging when the second light fitting elements 21b do not emit light, and the integrity of the fingerprint image is ensured. In the fingerprint image generated by using the first fingerprint image and the second fingerprint image, noise points in the first imaging region 40b of each grid cell 40a is greatly reduced, and the fingerprint recognition precision is improved.

According to the display panel provided by the embodiment of the present disclosure, each of the plurality of imaging apertures 11 corresponds to multiple ones of the plurality of light fitting elements, the multiple light-emitting elements include a plurality of first light-emitting elements and a plurality of second light-emitting elements, and the distance between the orthographic projection of the first light-emitting element on the plane of the light shielding layer and the imaging aperture is greater than the distance between the orthographic projection of the second light-emitting element on the plane of the light shielding layer and the imaging aperture. In the first detection stage, the first light-emitting elements emit light, none of the second light-emitting elements emits light, the fingerprint recognition module 40 generates the first fingerprint image, the noise points caused by the light emitted by the second light-emitting elements and reflected by the touch functional layer are reduced in the first fingerprint image, and the number of the noise points in the first fingerprint image is remarkably reduced. In the second detection stage, the second light-emitting elements emit light, and the fingerprint recognition module 40 generates the second fingerprint image. The first fingerprint image and the second fingerprint image corresponding to the same imaging aperture are combined in such a manner that the generated fingerprint image includes the first imaging region of the first fingerprint image and the second imaging region of the second fingerprint image. Therefore, the number of noise point in the fingerprint image is greatly reduced without affecting the integrity of the fingerprint image, and the fingerprint recognition precision is improved.

In one or more embodiments, the distance d between the orthographic projection of the second light-emitting element on the plane of the light shielding layer and the imaging aperture satisfies:

$$d \geq \frac{ph^2}{u^2},$$

where p is the distance between the central points of any two adjacent imaging apertures, h is the vertical distance between the touch functional layer and the light shielding layer, and u is the vertical distance between the touch surface of the display panel and the light shielding layer.

Figure 12:
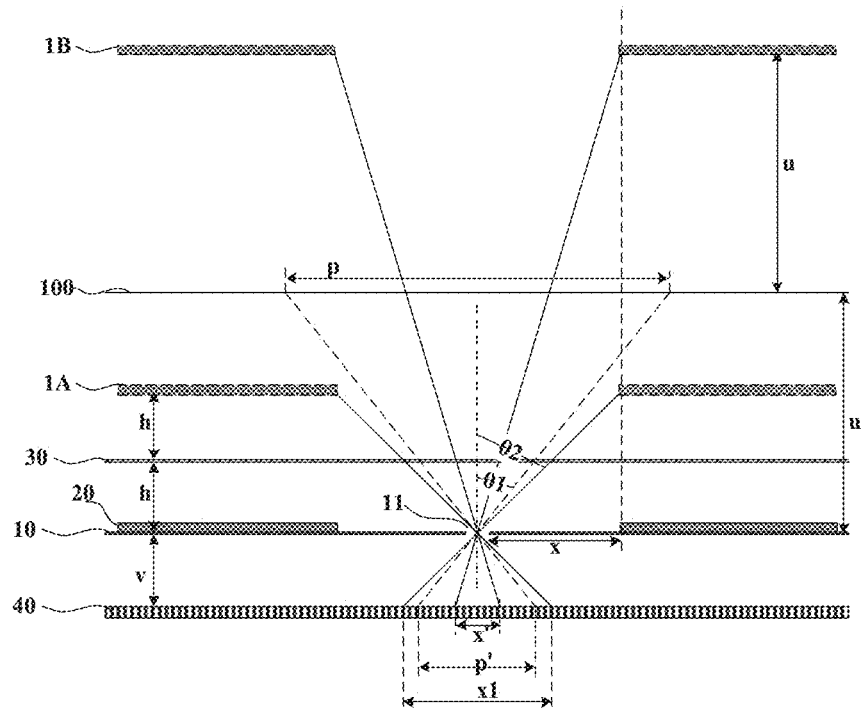
FIG. 12 is a schematic view of fingerprint imaging in a first detection stage when a light-emitting element in a display panel is used as a light source for the fingerprint recognition according to an embodiment of the present disclosure.

Referring to FIG. 12, in the first detection stage, the light-emitting elements, which are within a range whose center is the imaging aperture 11 and whose radius is x, are turned off, so that the turned-off light-emitting elements do not cause noise points due to the reflection of the touch functional layer, and no noise point is generated in the corresponding noise point imaging region x1. In addition, since the light-emitting elements are turned off, no finger signal light is generated, and the corresponding second imaging region 40c does not contain finger information. As stated above, some light-emitting elements cause noise points, and these noise points may form a noise imaging region x1. The light-emitting elements causing the noise imaging region x1 include light-emitting elements causing noise points in the fingerprint imaging region p' and light fitting elements causing noise points in other regions. If the light-emitting elements which cause noise points are all turned off, the intensity of the light for fingerprint recognition may be affected. In embodiments of the present closure, merely the light-emitting elements causing noise points in the fingerprint imaging region p' are turned off, and the light-emitting elements causing noise points in regions other than the fingerprint imaging region p' are turned on. The light-emitting elements causing noise points in the fingerprint imaging region p' are the second light-emitting elements turned off in the first detection stage. Optionally, x is greater than or equal to d and less than d1, and the second light-emitting elements in the second light-emitting element region are turned off in the first detection stage.

Figure 13:
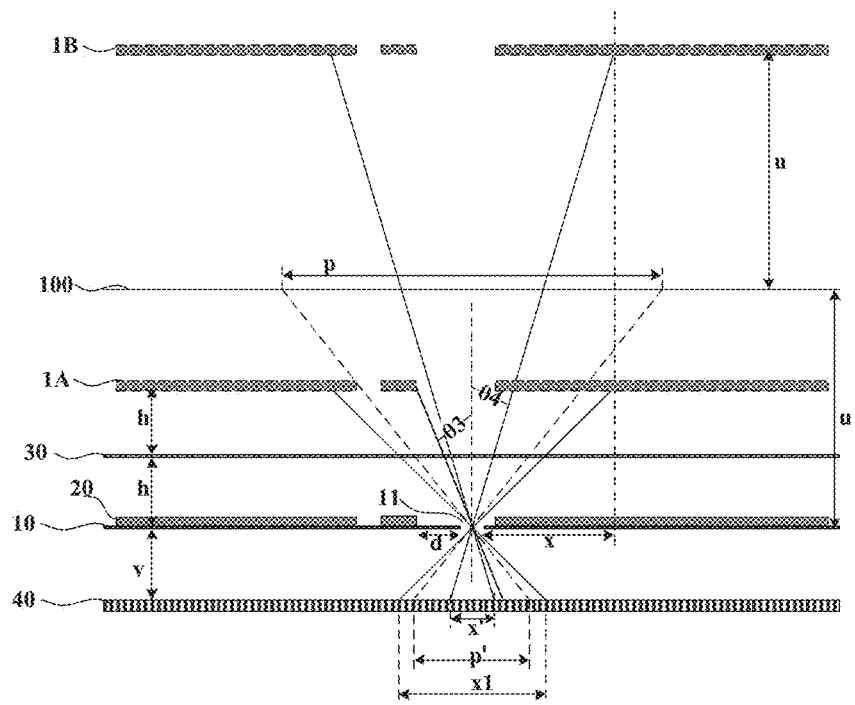
FIG. 13 is a schematic view of fingerprint imaging in a second detection stage when a light fitting element in a display panel is used as a light source for the fingerprint recognition according to an embodiment of the present disclosure.

Because the noise imaging region x1 is greater than the fingerprint imaging region p', θ1 is smaller than θ2. When tan θ1=p/2u, tan θ2=x/2h, then x/2h>p/2u, x>ph/u. Furthermore, as shown in FIG. 13, in the second detection stage, fingerprint imaging corresponding to the fingerprint imaging region x' is performed. To ensure the fingerprint imaging of the fingerprint imaging region x' is not interfered with by noise points, the light emitted by the nearest fingerprint recognition light source and reflected by the touch functional layer 30 should not enter the fingerprint imaging region x', that is θ3 needs to be greater than θ4. When tan θ3=d/2h and tan θ4=x/2u, d/2h>x/2u, and du/h>x.

Based on the above formulas, $d>ph^2/u^2$.

In addition, it should be noted that the noise imaging region x1 is greater than the fingerprint imaging region x', so when the second fingerprint image is acquired, the noise point that may affect the fingerprint imaging region x' is the noise point within the noise imaging region x1, and the noise point within the noise imaging region x1 is generated by the second light-emitting element, but cannot be the noise point generated by the first light-emitting element. Therefore, in the second detection stage, even if the light-emitting elements outside the noise imaging region x1 emit light, these light-emitting elements do not cause noise points in the noise imaging region x1, and the fingerprint imaging region x' cannot be influenced correspondingly.

In summary, the distance d between the orthographic projection of the second light-emitting element 21b on the plane of the light shielding layer 10 and the imaging aperture 11 satisfies the following condition:

$$d \geq \frac{ph^2}{u^2}.$$

When the distance d between orthographic projection of the second light-emitting element 21b on the plane of the light shielding layer 10 and the imaging aperture 11 satisfies the above condition, the light emitted by the second light-emitting element 21b and reflected by the touch surface 100 must pass through the imaging aperture 11 and enter the fingerprint recognition module 40, and the corresponding second imaging region 40c is located between noise points, so that the amount of noise points in the second imaging region 40c is reduced. The noise of the combined fingerprint image is further reduced, and the definition of the fingerprint image and the fingerprint recognition precision are improved.

In the embodiment, if the distance d between the orthographic projection of the second light-emitting element on the plane of the light shielding layer and the imaging aperture satisfies the above formula, the second imaging region 40c formed by the light emitted by the second light-emitting element and reflected by the touch surface is completely between the noise points and is hardly affected by the noise points. The final fingerprint image is obtained by combining the first imaging region 40b of the first fingerprint image and the second imaging region 40c of the second fingerprint image, and the noise points in the combined fingerprint image are reduced or even eliminated. For example, p is 378 µm, s is 150 µm, u is 900 µm, and d is greater than 10 µm, so the second imaging region 40c is between the noise points and an optimal display effect is obtained.

Optionally, d is within a range of 10 µm to 200 µm. In an exemplary embodiment, in combination with FIG. 14, the distance between the orthographic projection of the second light-emitting element 21b on the plane of the light shielding layer 10 and the imaging aperture 11 has a minimum value of 10 µm and a maximum value of 200 µm. The light-emitting elements within the range of 10 µm to 200 µm around the imaging aperture 11 are the second light-emitting elements 21b. By arranging the second light-emitting elements 21b within the range, in the second fingerprint image, the image formed by the light that is emitted by the second light-emitting element and reflected by the touch surface is completely between the noise points, so the image formed by the light emitted by the second light-emitting element and reflected by the touch surface is not influenced by the noise points, thereby further reducing the number of the noise points in the combined fingerprint image and improving the definition of the fingerprint image and the fingerprint recognition precision. In an exemplary embodiment, the distance between the boundary of the first light-emitting element and the second light-emitting element and the corresponding imaging aperture is greater than or equal to 200 µm.

Figure 14:
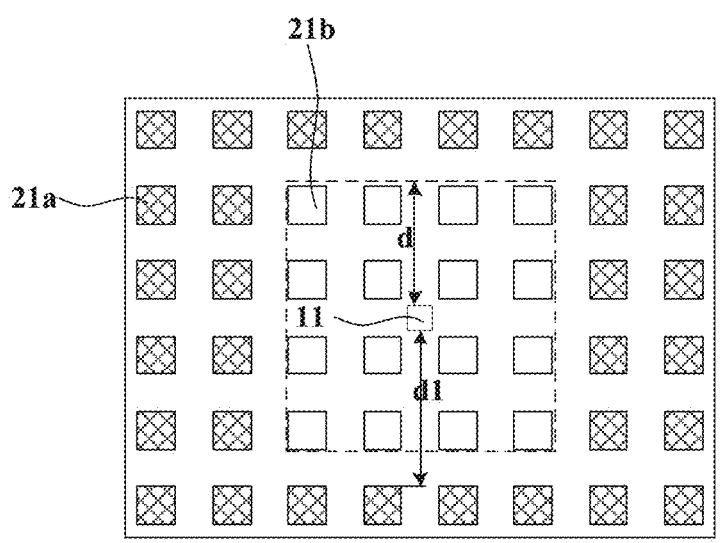
FIG. 14 is a schematic view illustrating a display image of a display panel in a second detection stage according to an embodiment of the present disclosure.

In an exemplary embodiment, as shown in FIG. 14, in the second detection stage, the first light-emitting elements 21a do not emit light. That is, only the second light-emitting elements 21b serve as the light source for the fingerprint recognition in the second detection stage, so in the second detection stage, the fingerprint recognition module generates the second fingerprint image only according to the reflected lights emitted by the second light-emitting elements 21b. The first light-emitting elements 21a are turned off in the second detection stage and do not emit light, so the corresponding second fingerprint image does not include the image and noise points caused by the light emitted by the first light-emitting element 21a. Therefore, the second imaging region (refer to FIG. 40c) in the second fingerprint image does not include the noise points caused by the light emitted by the first light-emitting element 21a, and the fingerprint image definition of the second imaging region in the second fingerprint image is improved.

The second imaging region of the fingerprint image obtained by combining the second fingerprint image and the first fingerprint image does not include noise points caused by the light emitted by the first light-emitting elements. Furthermore, the noise points in the first imaging region (refer to the upper FIG. 40b) caused by the light emitted by the second light-emitting elements is reduced, so the image definition of the fingerprint image is further improved, and the fingerprint recognition precision is further improved.

Figure 15:
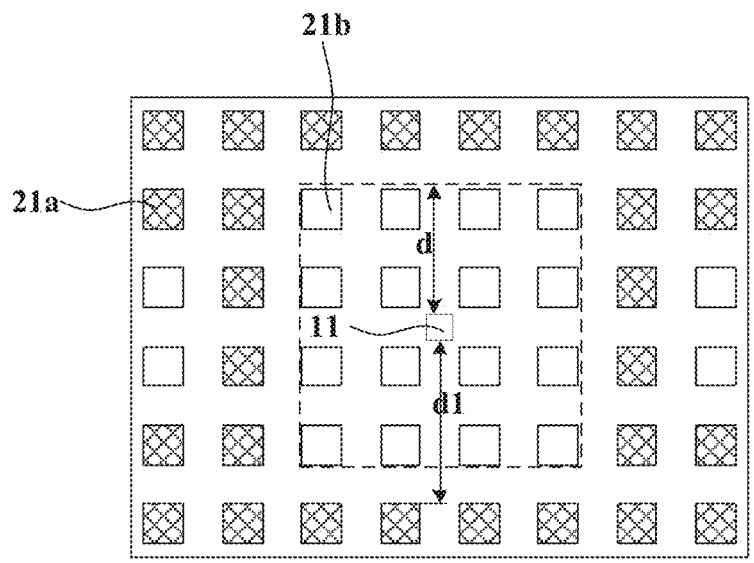
FIG. 15 is a schematic view illustrating a display image of a display panel in a second detection stage according to an embodiment of the present disclosure.

FIG. 15 is a schematic view showing light-emitting elements of the display panel in the second detection stage according to an embodiment of the present disclosure. Optionally, in the second detection stage, at east one first light-emitting element 21a emits light. That is, the light source for the fingerprint recognition of the second detection stage includes the at least one first light-emitting element 21a and the second light-emitting elements 21b. In the second detection stage, the fingerprint recognition module generates the second fingerprint image according to the light emitted by the second light-emitting elements 21b and the light emitted by the at least one first light-emitting element 21a. Herein, when at least one first light-emitting element 21a is turned on, only the light emitted by the turned-on first light-emitting element 21a participates in the generation of the second fingerprint image in the fingerprint recognition module, and the turned-off first light-emitting element 21a does not participate in the generation of the second fingerprint image in the fingerprint recognition module. Even if the light emitted by the first light-emitting element 21a and reflected by the finger or the touch functional layer is received by the fingerprint recognition module, the noise points in the second imaging region 40c which may affect the image quality are caused by the light emitted by the second light-emitting elements. Therefore, in the second detection stage, the turned-on first light-emitting elements 21a do not cause noise points in the second imaging region 40c, and accordingly, the fingerprint imaging region x' is not affected. In FIGS. 14 and 15, the boxes filled with white represent the light-emitting elements which are emitting light, and the boxes filled with a pattern are the light-emitting elements which are not emitting light.

In view of the above, the light, which is emitted by the first light-emitting element and reflected by the finger and passes through the imaging aperture 11, can enter the fingerprint recognition module 40 and be received by optical sensors in the fingerprint recognition module 40, and the light, which is emitted by the second light-emitting element and reflected by the finger and passes through the imaging aperture 11, can also enter the fingerprint recognition module 40 and be received by optical sensors in the fingerprint recognition module 40. The light emitted by the first light-emitting element and reflected by the touch functional layer may pass through the imaging aperture 11, enter the fingerprint recognition nodule 40, but cannot be received by optical sensors in the fingerprint recognition module 40 due to large incident angels. However, the light emitted by the second light-emitting element and reflected by the touch functional layer may pass through the imaging aperture 11, enter the fingerprint recognition module 40, and be received by optical sensors in the fingerprint recognition module 40. Moreover, the luminescence intensity of the fingerprint recognition is increased, thereby increasing the signal intensity and improving the signal accuracy.

In an exemplary embodiment, the time interval between the first detection stage and the second detection stage is less than or equal to 100 milliseconds. When ambient light passes through the touch surface and the imaging apertures and reaches the fingerprint recognition module, the brightness of the fingerprint image is affected. If the intensity of the ambient light in the first detection stage is different the intensity of the ambient light in the second detection stage, the brightness of the fingerprint image generated in the first detection stage and the brightness of the fingerprint image generated the second detection stage are easily influenced, so the brightness of the first fingerprint image is different from that of the second fingerprint image, and a visible boundary between the second imaging region and the first imaging region exists in the combined fingerprint image, affecting the display effect. The intensity change of the ambient light is in the order of seconds. The light intensity of the ambient light changes in unit of 3 seconds generally, so the light intensity of the ambient light may be considered to be constant within 3 seconds. Based on the above, the time interval between the first detection stage and the second detection stage is configured to be smaller than the time interval in which the ambient light changes, so that the intensity of the ambient light in the first detection stage in which the first fingerprint image is acquired is almost equal to the intensity of the ambient fiat in the second detection stage in which the second fingerprint image is acquired, which can reduce the influence of the ambient light on the fingerprint image.

Figure 16:
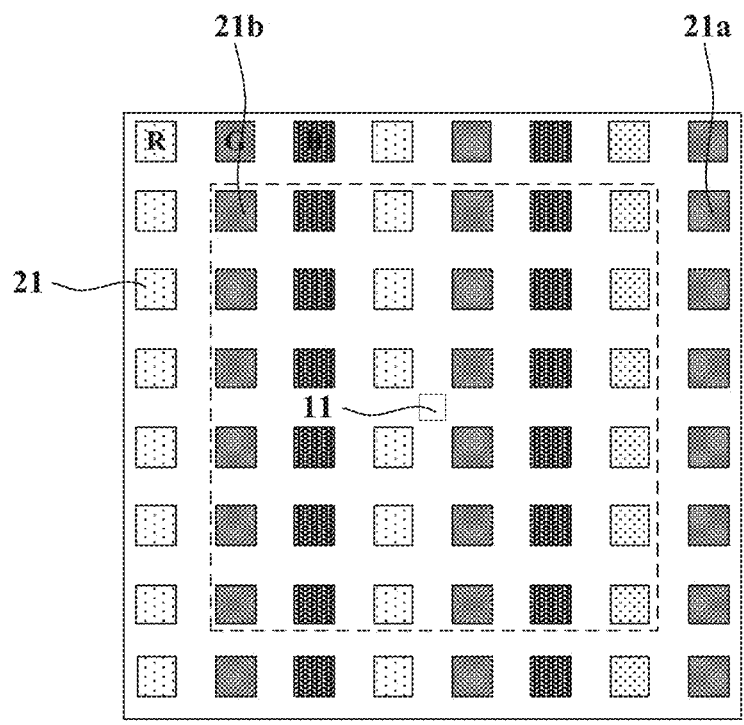
FIG. 16 is a schematic view of a pixel arrangement of a display panel according to an embodiment of the present disclosure.
Figure 17:
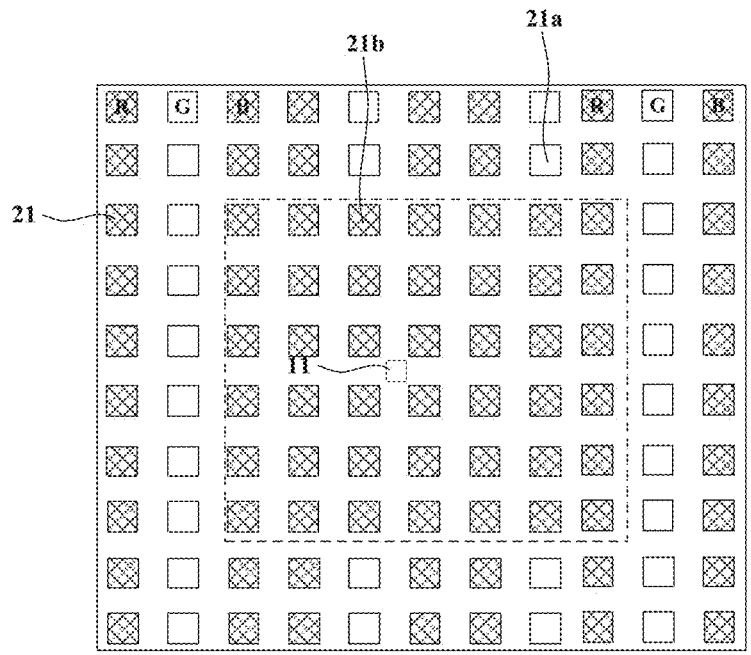
FIG. 17 is a schematic view illustrating a display image of the display panel shown in FIG. 16 in a first detection stage.
Figure 18:
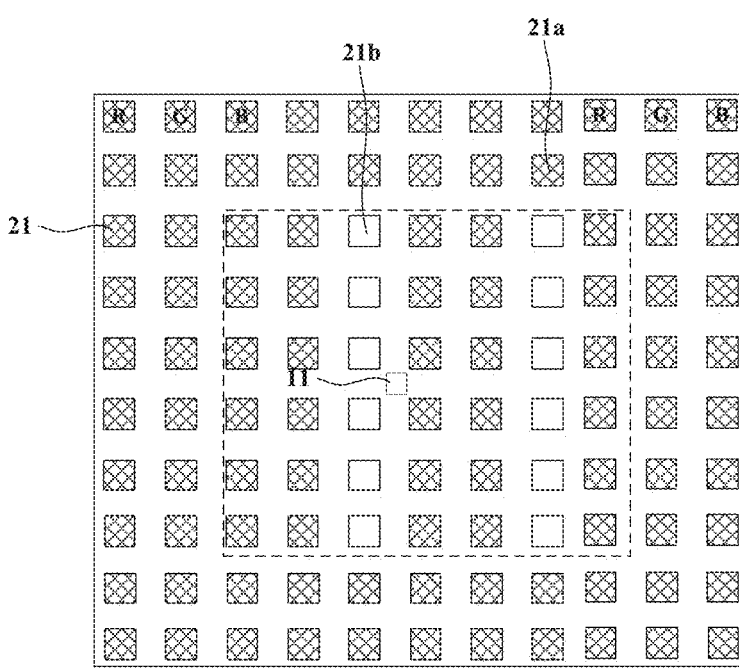
FIG. 18 is a schematic view illustrating a display image of the display panel shown in FIG. 16 in a second detection stage.

FIG. 16 is a schematic view of a pixel arrangement of a display panel according to an embodiment of the present disclosure. In an exemplary embodiment, the plurality of light-emitting elements 21 emit light in at least two different colors, that is, the plurality of light-emitting elements 21 may include light-emitting elements configured to emit light of a first color and light fitting elements configured to emit light of a second color. The light emitted by the first light-emitting element 21a and the light emitted by the second light-emitting element 21b are of the same color. In an exemplary embodiment, both the first light-emitting element 21a and the second light-emitting element 21b are configured to emit green light. FIG. 17 is a schematic view showing the light-emitting elements in the first detection stage, and FIG. 18 is a schematic view showing the light-emitting elements in the second detection stage. Herein, the boxes filled with white represent the light-emitting elements which are emitting light, and the boxes filled with a pattern are the light-emitting elements which are not emitting light.

In the embodiment, the light-emitting element layer includes a plurality of light-emitting elements 21, and the plurality of light-emitting elements 21 emit light in at least two different colors. The plurality of light-emitting elements 21 includes three types of light-emitting elements configured to emit three different color lights respectively: red light-emitting elements R, green light-emitting elements G, and blue light-emitting elements B. In other embodiments, the plurality of light-emitting elements include four colors or other color combinations. In the embodiment, the plurality of light-emitting elements 21 are arranged in an array, each the imaging aperture 11 is among multiple light-emitting elements 21. In FIG. 16 to FIG. 18, the reference number 11 represents the orthographic projection of the imaging aperture 11 on the plane of the light shielding layer and the reference number 21 represents the orthographic projection of the light-emitting element 21 on the plane of the light shielding layer.

In one or more embodiments, the first light-emitting elements 21a which emit light in the first detection stage are all green light-emitting elements, and the second light-emitting elements 21b which emit light in the second detection stage are all green light-emitting elements. The green light-emitting elements are used as the fingerprint recognition light source for the following reason. The service life of the light-emitting material of the green light-emitting element is longer than the service life of the light-emitting material of the blue light-emitting element. If the blue light fitting elements are used as the fingerprint recognition source, the service life of the blue light-emitting element is further reduced, and the service life of the light-emitting element layer is also reduced. On the other hand, the red light-emitting element is more likely to be affected the external interference than the green light-emitting element. Ambient light such as sunlight, red light, infrared light and the like is similar to the light emitted by the red light-emitting element and may be received by the optical sensors in the fingerprint recognition module 40, so the generated fingerprint image is affected, and the fingerprint recognition precision is further influenced. Therefore, by using the green light-emitting elements as the fingerprint recognition light source, the service life of the display panel is ensured, and the influence of external interference on fingerprint recognition is reduced.

Figure 19:
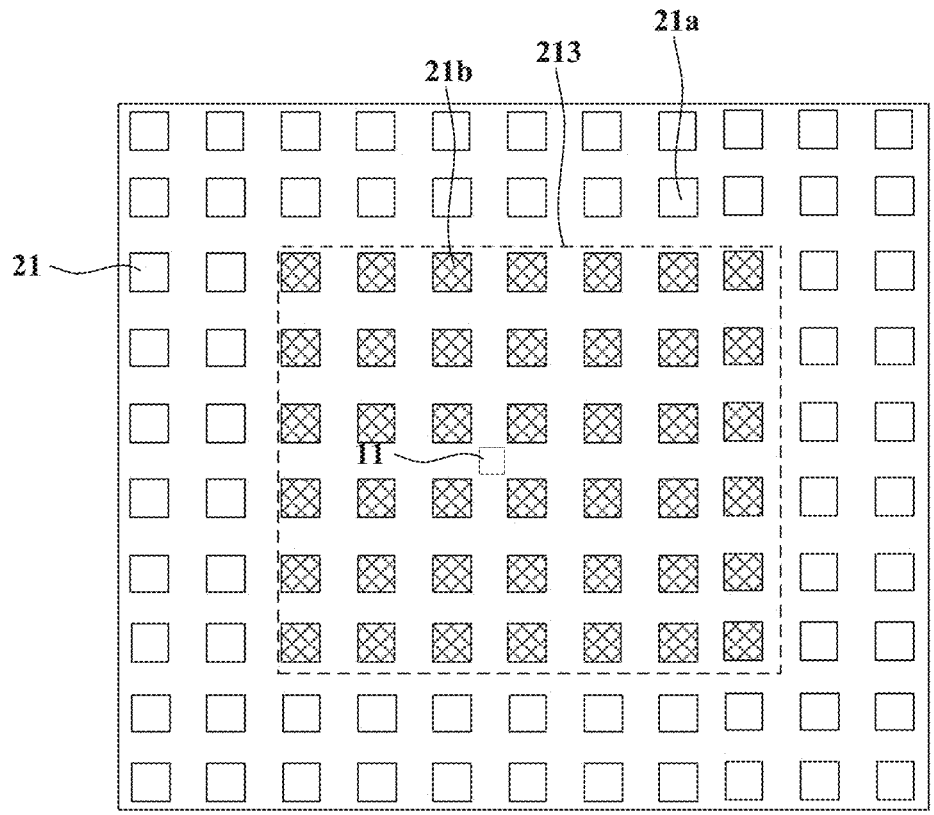
FIG. 19 is a schematic view illustrating a display image of the display panel shown in FIG. 16 in a first detection stage.

In one or more embodiments, as shown in FIG. 19, the second light-emitting elements 21b which do not emit light in the first detection stage form multiple square regions 213, each of which is surrounded by multiple first light-emitting elements 21a. The orthographic projection of one of the multiple square region 213 on the light shielding layer 10 surrounds a corresponding imaging aperture 11. The imaging apertures 11 need to be arranged in a such manner that crosstalk between pixels is reduced and a complete image of the touch surface can be acquired. Therefore the arrangement of the imaging apertures 11 determines the shape of the imaging aperture recognition range 11a. In one or more embodiments, the imaging apertures 11 are arranged uniformly, and the imaging aperture recognition range 11a of the imaging aperture 11 is square, so that the imaging aperture recognition ranges 11a of all the imaging apertures 11 of the light shading layer 10 can cover the whole touch surface, and the fingerprint recognition precision is improved.

In one or more embodiments, the imaging apertures 11 are arranged in an array, and the square regions 213 are arranged in an array. The arrangement of the imaging apertures 11 determines the shape of the region formed by the second light-emitting elements 21b which do not emit light in the first detection stage. According to the arrangement of the imaging apertures 11, the second light-emitting elements 21b which do not emit light in the first detection stage forms square regions 213, the imaging apertures 11 are arranged in an array, the region formed by the second light-emitting elements 21b which do not emit light in the first detection stage is the square regions 213, and each square region 213 is surrounded by the first light-emitting elements.

Figure 20:
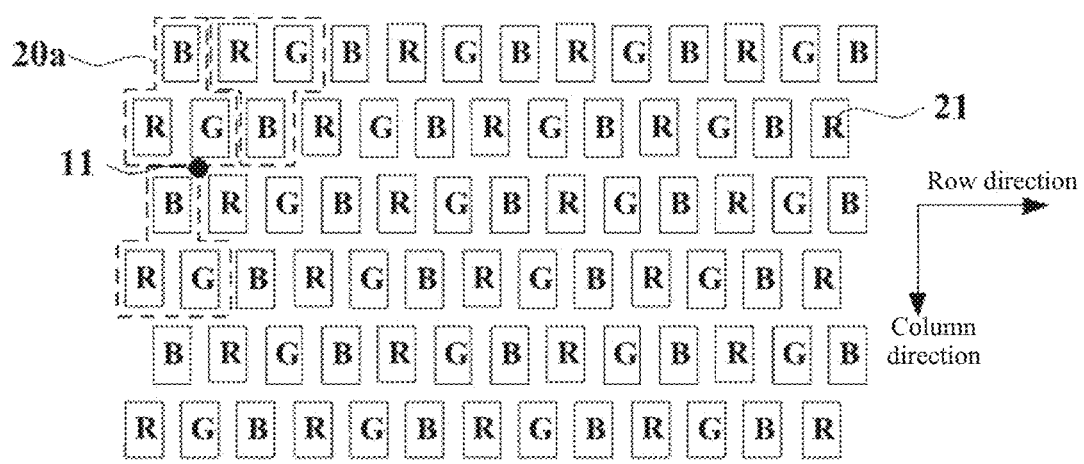
FIG. 20 is a schematic view of a pixel arrangement of a display panel according to an embodiment of the present disclosure.

In one or more embodiments, as shown in FIG. 20, the plurality of light-emitting elements 21 are arranged in rows and the columns. Each light-emitting element 21 is configured to emit light of a color different from that of the light emitted by an adjacent light-emitting element 21 located in the same row, each light-emitting element 21 is configured to emit light of a color different from that of the light emitted by an adjacent light-emitting element 21 located in the same column. Every two adjacent rows of light-emitting elements 21 are arranged in a staggered manner in the column direction. As shown in FIG. 20, the light-emitting element 21 in one row corresponds to the gap between two light-emitting elements 21 in an adjacent row. That is, column-direction central lines of the light-emitting elements 21 in one row are alternately arranged with column-direction central lines of the light-emitting elements 21 in an adjacent row. Each light-emitting element 21 and its two adjacent light-emitting elements 21 in the adjacent row and configured to emit light in different colors are in triangular arrangement and make up a light-emitting unit 20a. Each imaging aperture 11 is disposed between two light-emitting units 20a adjacent in the column direction, and the square regions are arranged in triangular arrangement.

In the embodiment, when the light-emitting elements 21 are in triangular arrangement, each imaging aperture 11 is disposed between two adjacent light-emitting units 20a, and the arrangement of the light-emitting elements 21 does not affect the arrangement of the imaging apertures 11. In other embodiments, the light-emitting elements may be arranged in an array and the imaging apertures may be arranged in an array.

An embodiment of the present disclosure further provides a driving method of a display panel. As shown in FIG. 4, the display panel includes: a fingerprint identification module 40, a light shielding layer 10 on the fingerprint identification module 40, a light-emitting element layer 20 on the light shielding layer 10, and a touch function layer 30 on the light-emitting element layer 20. The light shielding layer 10 includes a plurality of imaging apertures 11. The light-emitting element layer 20 includes a plurality of light-emitting elements 21, and the light-emitting elements 21 include a plurality of first light-emitting elements 21a and a plurality of second light-emitting elements 21b, where a distance d1 between an orthographic projection of the first light-emitting element 21a on the light shielding layer 10 and the imaging apertures 11 is greater than a distance d between an orthographic projection of the second light-emitting element 21b on the light shielding layer 10 and the imaging apertures 11.

In addition to the layers shown in FIG. 4, the display panel further includes other layers, such as a gate metal layer, a capacitor metal layer, a source/drain metal layer, and organic layers and/or inorganic layers. In the embodiment shown in FIG. 4, the fingerprint recognition module 40 is located on the side, facing away from the light shielding layer 10, of the array substrate 50, and the touch functional layer 30 is located on the side, facing away from the light shielding layer 10, of the encapsulation layer 60. In other embodiments, the fingerprint recognition module may be integrated inside the display panel. Alternatively, the touch functional layer may be integrated inside the display panel. It will be understood by those skilled in the art that FIG. 4 just shows an example of the display panel of the present disclosure, and the display panel of the present disclosure is not limited to the structure shown in FIG. 4.

Figure 21:
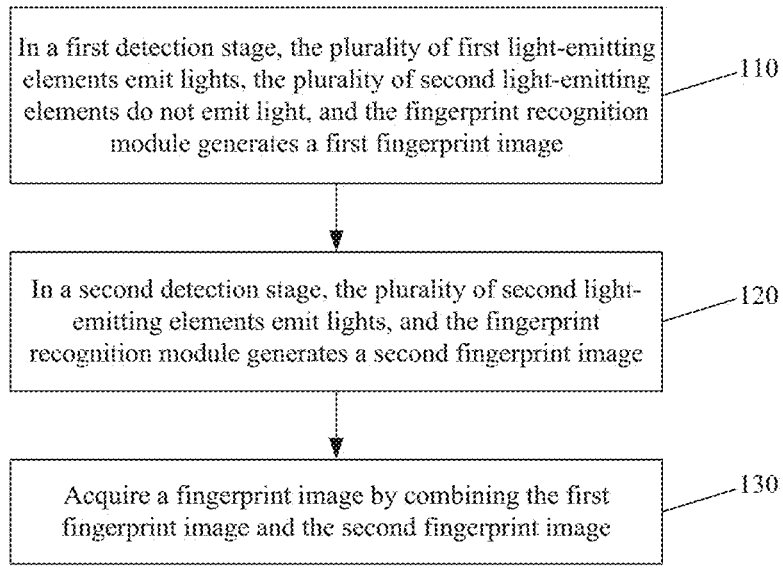
FIG. 21 is a flowchart of a driving method for a display panel according to an embodiment of the present disclosure.

As shown in FIG. 21, the driving method provided by the embodiment includes the steps described below.

In step 110, in a first detection stage, the first light-emitting elements emit light, the second light-emitting elements do not emit light, and the fingerprint recognition module generates a first fingerprint image.

In step 120, in a second detection stage, the second light-emitting elements emit light, and the fingerprint recognition module generates a second fingerprint image.

In step 130, the first fingerprint image and the second fingerprint image are combined to obtain a fingerprint image.

In one or more embodiments, the display panel includes a driving chip, and the driving chip controls the light emission of the light-emitting elements, and also controls the operation of fingerprint recognition module. Specifically, the driving chip controls the fingerprint recognition module to generate the first fingerprint image and the second fingerprint image, and combine first fingerprint image and the second fingerprint age to acquire the fingerprint image, so that the influence of reflection noise is avoided.

In one or more embodiments, the distance d between the orthographic projection of the second light-emitting element on the light shielding layer and the imaging aperture satisfies:

$$d \geq \frac{ph^2}{u^2},$$

where p is the distance between the central points of any two adjacent imaging apertures, h is the vertical distance between the touch functional layer and the light shielding layer, and u is the vertical distance between the touch surface of display panel and the light shielding layer. In the embodiment, when the distance d between the orthographic projection of the second light-emitting element on the light shielding layer and the imaging aperture satisfies the above condition, the image in the second fingerprint image generated when the second light-emitting elements serve as the fingerprint recognition light source is located between the noise points. When the first and second fingerprint images are combined, the number of the noise points can be further reduced, and the fingerprint recognition precision can be improved.

In the embodiment, in the first detection stage, the first light-emitting elements emit light, the second light-emitting elements do not emit light. Therefore, the first fingerprint image generated by the fingerprint recognition module does not contain noises caused by the second light-emitting elements, and the number of the noise points in the first fingerprint image is remarkably reduced. In the second detection stage, the second light-emitting elements emit light, and the fingerprint recognition module generates the second fingerprint image. Then the first imaging region of the first fingerprint image and the second imaging region of the second fingerprint image are combined, the first fingerprint image and the second fingerprint image correspond to the same imaging aperture. With the above method, the number of noise points in the fingerprint image is reduced and the precision of fingerprint recognition is ensured while ensuring the integrity of the fingerprint image.

Figure 22:
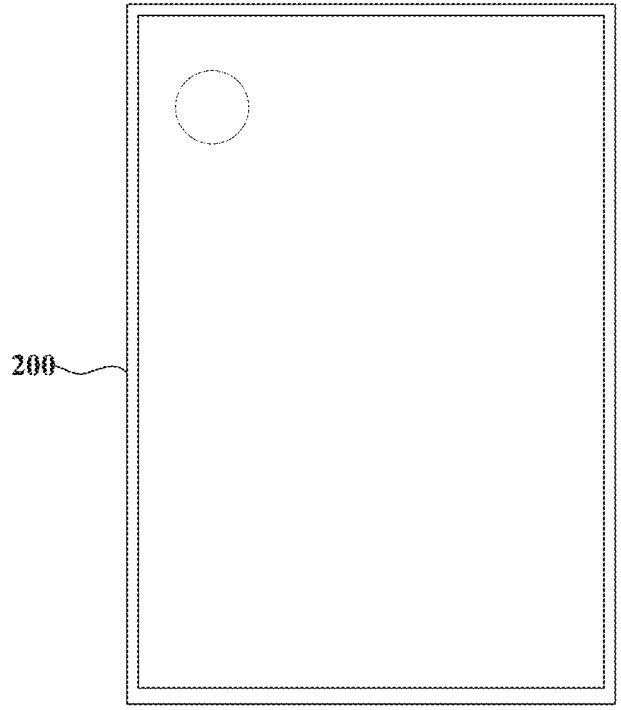
FIG. 22 is a schematic view of a display device according to an embodiment of the present disclosure.

The present disclosure further provides a display device. As shown in FIG. 22, a display device 200 includes the display panel as described above. Optionally, the display panel may be an organic light emitting display panel having touch function. The display device 200 is an electronic device such as a smart phone, and the display device 200 has a higher recognition identification precision.

It is to be noted that the above are merely exemplary embodiments of the present disclosure and the technical principles used therein. It will be understood by those skilled in the art that the present disclosure is not limited to the specific embodiments described herein. Those skilled in the art can make various modifications, adaptations, combinations and substitutions without departing from the scope of the present disclosure. Therefore, although the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
    a fingerprint recognition module;
    a light-shielding layer on the fingerprint recognition module;
    a light-emitting element layer located on the light-shielding layer; and
    a touch functional layer located on the light-emitting element layer;
    wherein the light-shielding layer comprises a plurality of imaging apertures, the light-emitting element layer comprises a plurality of light-emitting elements, and the plurality of light-emitting elements comprise a plurality of first light-emitting elements and a plurality of second light-emitting elements;
    wherein a distance between an orthographic projection of the first light-emitting element on a plane of the light-shielding layer and the corresponding imaging aperture is greater than a distance between an orthographic projection of the second light-emitting element on the plane of the light-shielding layer and the corresponding imaging aperture;

wherein in a first detection stage, the plurality of first light-emitting elements emit light, the plurality of second light-emitting elements do not emit light, and the fingerprint recognition module generates a first fingerprint image; and wherein in a second detection stage, the plurality of second light-emitting elements emit light, and the fingerprint recognition module generates a second fingerprint image;

wherein the first fingerprint image and the second fingerprint image are combined into a fingerprint image;

wherein the distance d between the orthographic projection of the second light-emitting element on the plane of the light-shielding layer is and the corresponding imaging aperture satisfies:

$$d \geq \frac{ph^2}{u^2},$$

wherein, p denotes a distance between center points of any two adjacent ones of the plurality of imaging apertures, h denotes a vertical distance between the touch functional layer and the light-shielding layer, and u denotes a vertical distance between a touch surface of the display panel and the light-shielding layer.

2. The display panel of claim 1, wherein d is in a range of 10 μm to 200 μm.

3. The display panel of claim 1, wherein in the second detection stage, at least one of the plurality of first light-emitting elements emits light.

4. The display panel of claim 1, wherein in the second detection stage, the plurality of first light-emitting elements do not emit light.

5. The display panel of claim I, wherein the plurality of light-emitting elements emit lights in at least two different colors, and lights emitted by the plurality of first light-emitting elements and lights emitted by the plurality of second light-emitting elements are of a same color.

6. The display panel of claim 5, wherein each of the plurality of first light-emitting elements and the plurality of second light-emitting elements emits green light.

7. The display panel of claim 1, wherein the plurality of second light-emitting elements which do not emit light in the first detection stage form a plurality of square regions, each of which is surrounded by multiple ones of the plurality of first light-emitting elements, and an orthographic projection of one of the plurality of square regions on the plane of the light-shielding layer surrounds a respective one of the plurality of imaging apertures.

8. The display panel of claim 7, wherein the plurality of imaging apertures are arranged in an array, and the square regions corresponding to the plurality of imaging apertures are arranged in an array.

9. The display panel of claim 7, wherein the plurality of light-emitting elements are arranged in a row direction and a column direction, two adjacent light-emitting elements in the same row emit light in different colors, two adjacent light-emitting elements in the same column emit light in different colors, the light-emitting elements in two adjacent rows are arranged in a staggered manner in the column direction, and wherein each of the plurality of light-emitting elements and two adjacent light-emitting elements in an adjacent row are in triangular arrangement, the lights emitted by the three light-emitting elements are of different colors, and the three light-emitting elements make up one light-emitting unit;

wherein each of the plurality of imaging apertures is arranged between two adjacent light-emitting units in the column direction, and the plurality of square regions are arranged in triangular arrangement.

10. The display panel of claim 1, wherein a time interval between the first detection stage and the second detection stage is less than or equal to 100 milliseconds.

11. A driving method of a display panel, wherein the display panel comprises: a fingerprint recognition module, a light-shielding layer on the fingerprint recognition module, a light-emitting element layer located on the light-shielding layer, and a touch functional layer located on the light-emitting element layer, wherein the light-shielding layer comprises a plurality of imaging apertures, the light-emitting element layer comprises a plurality of light-emitting elements, and each of plurality of imaging apertures corresponds to a plurality of first light-emitting elements and a plurality of second light-emitting elements among the plurality of light-emitting elements, wherein a distance between an orthographic projection of the first light-emitting element on a plane of the light-shielding layer and the corresponding imaging aperture is greater than a distance between an orthographic projection of the second light-emitting element on the plane of the light-shielding layer and the corresponding imaging aperture;

the driving method comprises:
in a first detection stage, controlling the plurality of first light-emitting elements to emit light and controlling the plurality of second light-emitting elements not to emit light, and acquiring a first fingerprint image by the fingerprint identification recognition;
in a second detection stage, controlling the plurality of second light-emitting elements to emit light, and acquiring a second fingerprint image the fingerprint recognition module; and
combining the first fingerprint image and the second fingerprint image into a fingerprint image;
wherein the distance d between the orthographic projection of the second light-emitting element on the plane of the light-shielding layer and the corresponding imaging aperture satisfies:

$$d \geq \frac{ph^2}{u^2},$$

wherein, p denotes a distance between center points of any two adjacent ones of the plurality of imaging apertures, h denotes a vertical distance between the touch functional layer and the light-shielding layer, and u denotes a vertical distance between a touch surface of the display panel and the light-shielding layer.

12. A display device, comprising: a display panel, wherein the display panel comprises:
a fingerprint recognition module;
a light-shielding layer on the fingerprint recognition module;
a light-emitting element layer located on the light-shielding layer; and
a touch functional layer located on the light-emitting element layer;

wherein the light-shielding layer comprises a plurality of imaging apertures, the light-emitting element layer comprises a plurality of light-emitting elements, and the plurality of light-emitting elements comprise a plurality of first light-emitting elements and a plurality of second light-emitting elements;

wherein a distance between an orthographic projection of the first light-emitting element on a plane of the light-shielding layer and the corresponding imaging aperture is greater than a distance between an orthographic projection of the second light-emitting element on the plane of the light-shielding layer and the corresponding imaging aperture;

wherein in a first detection stage, the plurality of first light-emitting elements emit light, the plurality of second light-emitting elements do not emit light, and the fingerprint recognition module generates a first fingerprint image; and wherein in a second detection stage, the plurality of second light-emitting elements emit light, and the fingerprint recognition module generates a second fingerprint image;

wherein the first fingerprint image and the second fingerprint image are combined into a fingerprint image;

wherein the distance d between the orthographic projection of the second light-emitting element on the plane of the light-shielding layer is and the corresponding imaging aperture satisfies:

$$d \geq \frac{ph^2}{u^2},$$

wherein, p denotes a distance between center points of any two adjacent ones of the plurality of imaging apertures, h denotes a vertical distance between the touch functional layer and the light-shielding layer, and u denotes a vertical distance between a touch surface of the display panel and the light-shielding layer.

13. The display device of claim 12, wherein d is in a range of 10 μm to 200 μm.

14. The display device of claim 12, wherein in the second detection stage, at least one of the plurality of first light-emitting elements emits light.

15. The display device of claim 12, wherein in the second detection stage, the plurality of first light-emitting elements do not emit light.

16. The display device of claim 12, wherein the plurality of light-emitting elements emit lights in at least two different colors, and lights emitted by the plurality of first light-emitting elements and lights emitted by the plurality of second light-emitting elements are of a same color.

17. The display device of claim 16, wherein each of the plurality of first light-emitting elements and the plurality of second light-emitting elements emits green light.

* * * * *